(12) United States Patent
Kennedy et al.

(10) Patent No.: US 12,297,639 B2
(45) Date of Patent: May 13, 2025

(54) ARTICULATING SUPPORT BRACKET

(71) Applicants: Shawn Kennedy, Drayton Valley (CA); Terry Hudson, Drayton Valley (CA)

(72) Inventors: Shawn Kennedy, Drayton Valley (CA); Terry Hudson, Drayton Valley (CA)

(73) Assignees: Shawn Kennedy, Drayton Valley (CA); Terry Hudson, Drayton Valley (CA)

( * ) Notice: Subject to any disclaimer, the term of this patent is extended or adjusted under 35 U.S.C. 154(b) by 0 days.

(21) Appl. No.: 18/461,649

(22) Filed: Sep. 6, 2023

(65) Prior Publication Data
US 2025/0075491 A1   Mar. 6, 2025

(51) Int. Cl.
*E04B 1/38*   (2006.01)
*F16M 13/00*   (2006.01)
*F16M 13/02*   (2006.01)
*E04B 1/19*   (2006.01)

(52) U.S. Cl.
CPC ........... *E04B 1/388* (2023.08); *F16M 13/022* (2013.01); *E04B 2001/1933* (2013.01); *E04B 2001/1963* (2013.01); *E04B 2001/389* (2023.08)

(58) Field of Classification Search
CPC .............. E04B 1/388; E04B 2001/389; E04B 2001/1933; E04B 2001/1963; F16M 13/022
See application file for complete search history.

(56) References Cited

U.S. PATENT DOCUMENTS

| 3,495,857 | A | | 2/1970 | Hawke et al. | |
|---|---|---|---|---|---|
| 4,324,083 | A | * | 4/1982 | Johnson, Jr. | E04B 1/19 403/219 |
| 4,577,449 | A | * | 3/1986 | Celli | F16B 7/048 52/655.1 |
| 5,626,434 | A | | 5/1997 | Cook | |
| 5,956,917 | A | * | 9/1999 | Reynolds | E04B 1/585 52/81.3 |
| 6,004,063 | A | | 12/1999 | Adams | |
| 8,215,326 | B2 | | 7/2012 | Park et al. | |

(Continued)

FOREIGN PATENT DOCUMENTS

| CH | 702858 A1 | 9/2011 |
|---|---|---|
| CN | 203569964 U | 4/2014 |
| KR | 101782292 B1 | 9/2017 |

*Primary Examiner* — Tan Le
(74) *Attorney, Agent, or Firm* — Argus Intellectual Enterprise, LLC; Jordan Sworen; Daniel Enea

(57) ABSTRACT

An articulating support bracket for building structures. The articulating support bracket includes supporting cap brackets each having a hollow interior for receiving a structural support member. A connection point disposed on each closed side of the supporting cap brackets that allow the support cap brackets to be connected to each other via a connecting bracket. The connecting bracket formed is formed by a pair of U-shaped members that can be pivotally secured to one another. The connecting or support brackets work by coupling the structural support members together in a way that allows a selectively change angles as needed without having to pre-cut the member or other materials to proper angles before erecting the building structure. The components of the articulating support bracket can be disassembled and reconstructed into the same structure in a different location or reconstructed into a different configuration with ease.

17 Claims, 12 Drawing Sheets

(56) References Cited

U.S. PATENT DOCUMENTS

| | | | |
|---|---|---|---|
| 8,528,291 B2 * | 9/2013 | Allred, III | ................ E04C 3/08 |
| | | | 52/81.3 |
| 10,900,216 B2 | 1/2021 | Thøgersen | |
| 2005/0163564 A1 | 7/2005 | Tuell | |
| 2011/0194889 A1 * | 8/2011 | Allred, III | ............ F16B 11/008 |
| | | | 403/170 |
| 2016/0289999 A1 * | 10/2016 | Choi | ....................... E04H 15/32 |
| 2018/0334801 A1 | 11/2018 | Brean | |

* cited by examiner

ARTICULATING SUPPORT BRACKET

BACKGROUND OF THE INVENTION

The present invention relates to support brackets for building structures. More specifically, the present invention provides a system of hinged or articulating support brackets that allow for interconnecting a plurality of structural support members into a modular framework without having to pre-cut any structural support member to a proper angle before erecting a structure.

In the realm of construction and building assembly, the use of support brackets to connect and secure structural members is a fundamental practice. Traditional support brackets often involve fixed connections, which necessitate precise pre-cutting of structural members to achieve desired angles during assembly. These fixed connections can lead to complications and inefficiencies, particularly in scenarios where adjustments are required on-site due to changing design requirements or unforeseen challenges.

Conventional systems typically involve welding, bolting, or otherwise rigidly fastening structural elements together. While these methods provide stability and strength, they are rigid in nature and do not easily accommodate alterations in angles or positions once the components are joined. The inflexibility of these existing systems often leads to time-consuming adjustments, wastage of materials, and the need for specialized equipment or skilled labor to achieve modifications on-site. Therefore, there exists a need for an articulating support bracket that allows for interconnecting a plurality of structural support members into a modular framework without having to pre-cut any structural support member to a proper angle before erecting a structure.

In light of the devices disclosed in the known art, it is submitted that the present invention substantially diverges in design elements and methods from the known art and consequently it is clear that there is a need in the art for an improvement for an articulating support bracket. In this regard the instant invention substantially fulfills these needs.

SUMMARY OF THE INVENTION

In view of the foregoing disadvantages inherent in the known types of support brackets now present in the known art. The present invention provides a new articulating support bracket wherein the same can be utilized for interconnecting a plurality of structural support members into a modular framework without having to pre-cut any structural support member to a proper angle before erecting a structure.

It is an objective of the present invention to provide combination supporting and articulating brackets and a method of use.

It is an objective of the present invention to provide an embodiment of the articulating support bracket comprising a plurality of supporting cap brackets each having a hollow interior for receiving a structural member therein, wherein each supporting cap bracket comprises a pair of opposing first sides perpendicular to a pair of opposing second sides, a closed end and an opposing open end. A connection point is disposed on each of the first sides, the second sides and the closed end and a connecting bracket is configured to connect with one or more of the plurality of supporting cap brackets at the connection point thereof. The connecting bracket forms a hinge that allows a first supporting cap bracket of the plurality of supporting cap brackets to pivot relative to a second cap bracket of the plurality of supporting cap brackets when connected via the connecting bracket.

It is an objective of the present invention to provide an embodiment of the articulating support bracket wherein the connecting bracket comprises a pair of similarly dimensioned U-shaped members each having a sleeve member connected to a pair of opposing tabs, the sleeve member having a cooperating connection point, and the pair of opposing tabs having a bolt connection point. The pair of U-shaped members are connected by overlapping each of the pair of opposing tabs and a bolt is inserted into the bolt connection point on each of the pair of opposing tabs.

It is another objective of the present invention to provide an embodiment of the articulating support bracket wherein the connecting brackets are adjustable or articulatable to any angle. The connecting or support brackets work by coupling structure frame materials together in a way that allows the user the opportunity to change angles as and when required. The user does not need to pre-cut lumber or other materials to proper angles before erecting their structure. The brackets result in a strong, sturdy and adjustable framework.

It is another objective of the present invention to provide an embodiment of the articulating support bracket wherein the components thereof can be disassembled and reconstructed into the same structure in a different location or reconstructed into a different frame configuration with ease.

The components disclosed herein allow consumers to purchase units to achieve desired structural design, wherein the units articulate to any angle without cutting for hassle free test fitting and application. Consumers can cut straight pieces of lumber and erect any configuration of structure they require or desire, depending on space, terrain restrictions or design preference with the ease of only hand tools.

The articulating support bracket is composed of strong material and construction which will meet or exceed the strength of conjoining material. It also allows for future expansion and design change, as well as easy replacement of material. For instance, the user could construct a patio gazebo using the articulating support bracket and years later could easily change the dimensions or configuration to suit their preference. To disassemble the articulating support bracket, the user would loosen the bolts on the connecting bracket and change angles as desired, still utilizing the same materials in another configuration, e.g.: shed, fence, deck frame. The units are modular providing for expansion by adding more units where desired.

It is therefore an object of the present invention to provide a new and improved articulating support bracket that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
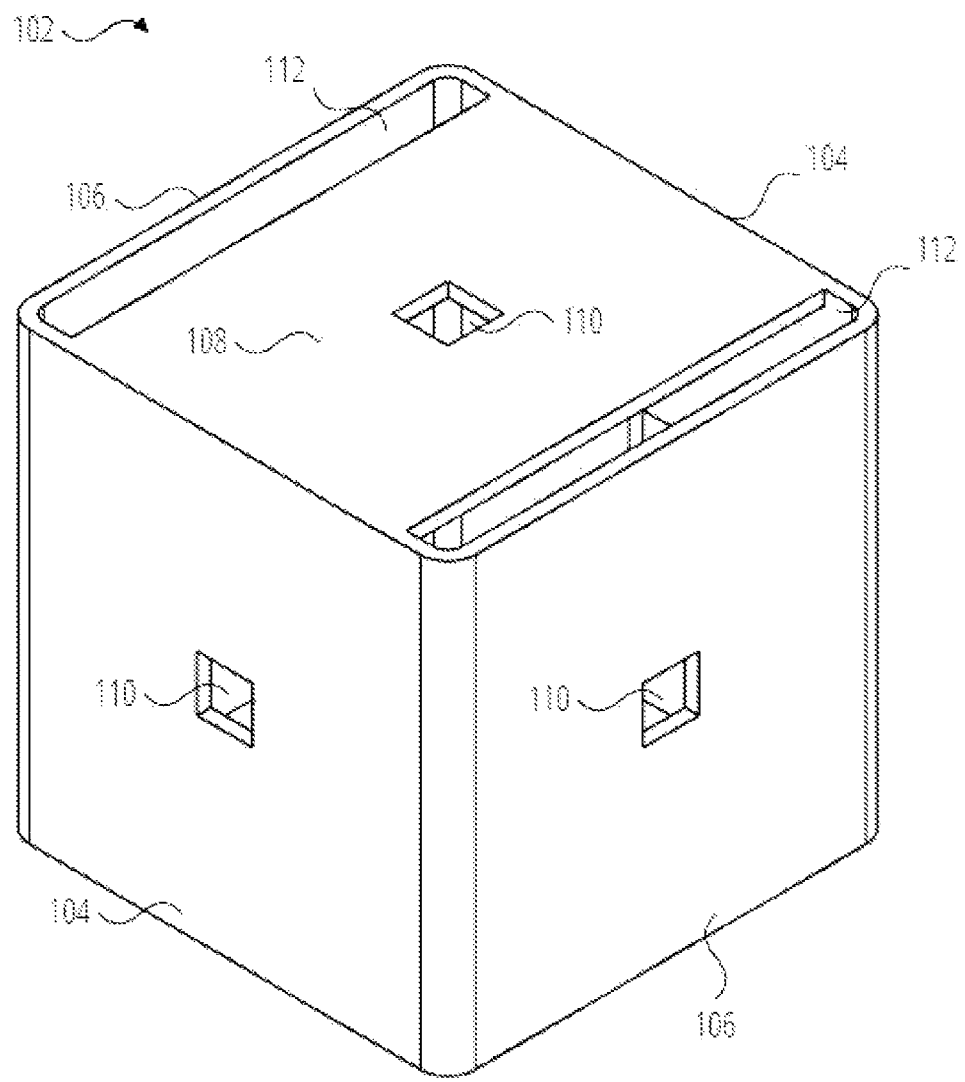
FIG. 1 shows a perspective view of a supporting cap bracket of an embodiment of the articulating support bracket.

Reference is made herein to the attached drawings. Like reference numerals are used throughout the drawings to depict like or similar elements of the articulating support bracket. For the purpose of presenting a brief and clear description of the present invention, the embodiment discussed will be used for interconnecting a plurality of structural support members into a modular framework. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment" does not necessarily refer to the same embodiment.

Referring now to FIG. 1, there is shown a perspective view of a supporting cap bracket of an embodiment of the articulating support bracket. The articulating support bracket comprises a supporting cap bracket 102 configured to secure to an end of a structural member. A structural member is any material that can be used to built or create a structural support, such dimensional lumber, a frame, a deck, a building, and the like. In the illustrated embodiment, the supporting cap bracket 102 comprises a substantially cube structure having a first pair of opposing sides 104 and a second pair of opposing sides 106 and a closed end 108. Each side of the first pair of opposing sides 104, and each side of the second pair of opposing sides 106, and the closed end 108 have a connection point or connection points 110. In some embodiments of the invention, the closed end 108 only attaches to only one of the edges of a pair of opposing sides, resulting in a slot 112 between the other of the pair of opposing sides. The cap 102 illustrated in FIG. 1 is configured to accommodate an essentially square piece of lumber. For example, to accommodate lumber having pre-planed dimensions of: 2"×2"; 4"×4"; or 6"×6".

Figure 2:
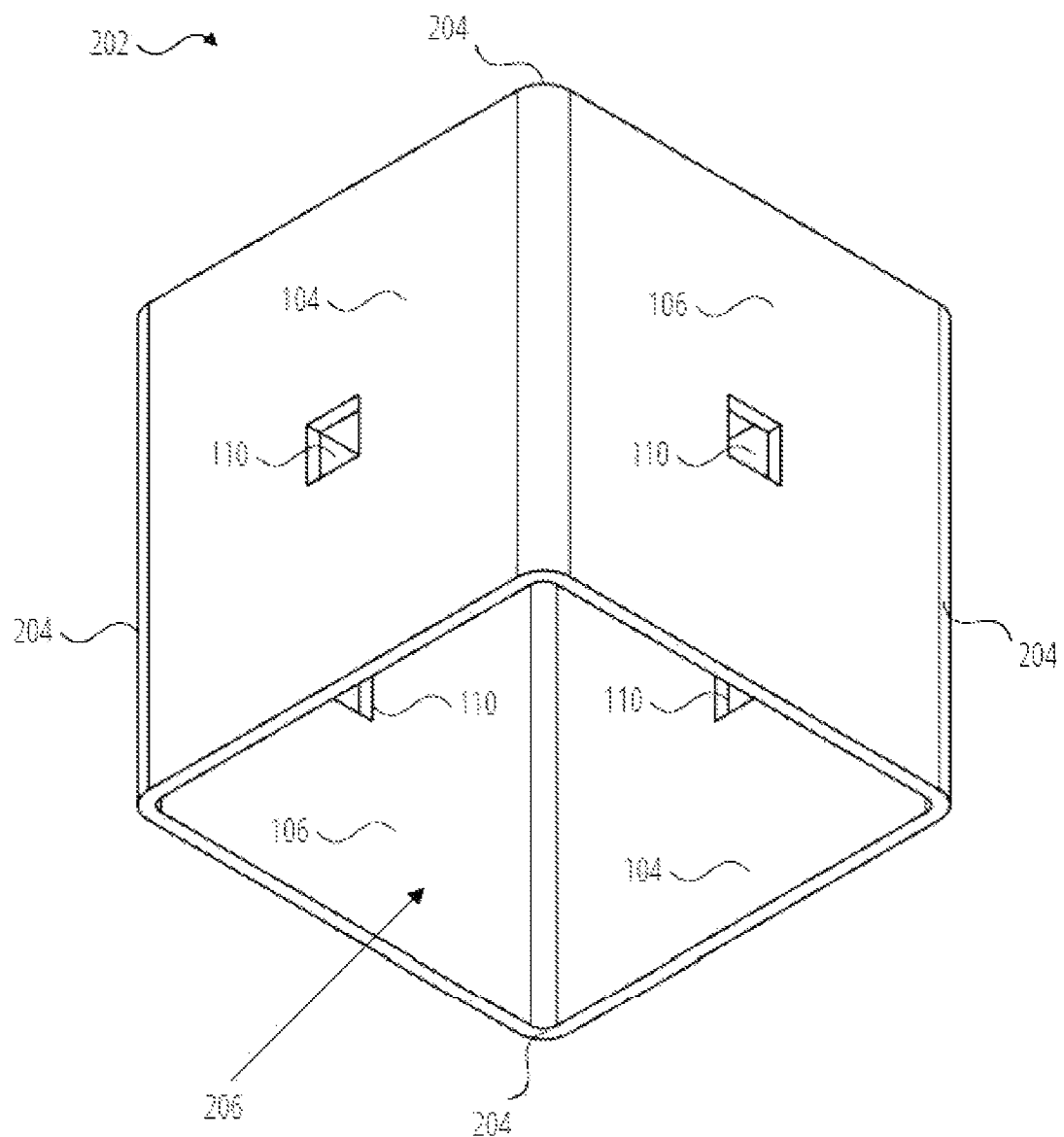
FIG. 2 shows another perspective view of a sleeve of an embodiment of the articulating support bracket.
Figure 3:
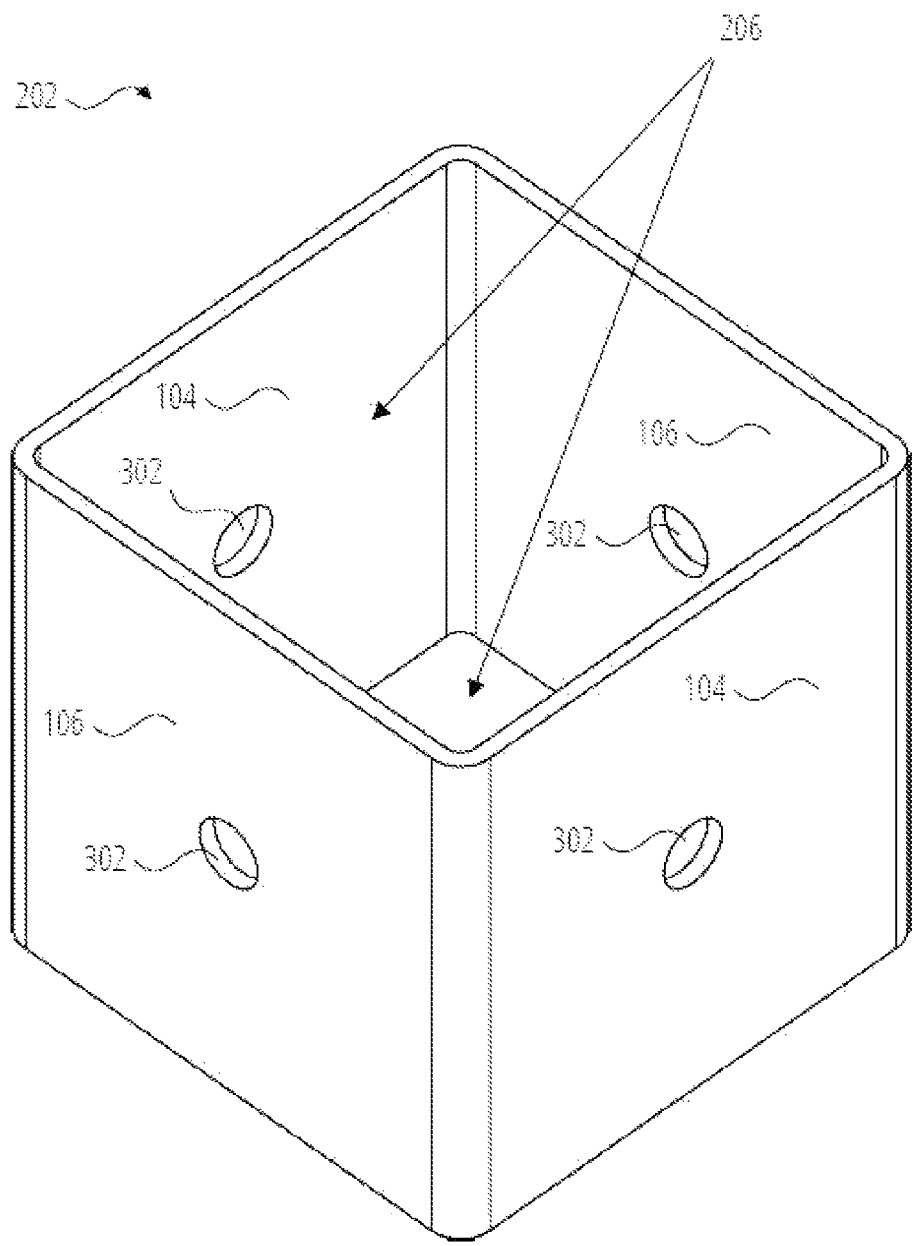
FIG. 3 shows yet another perspective view of another sleeve of an embodiment of the articulating support bracket.
Figure 4:
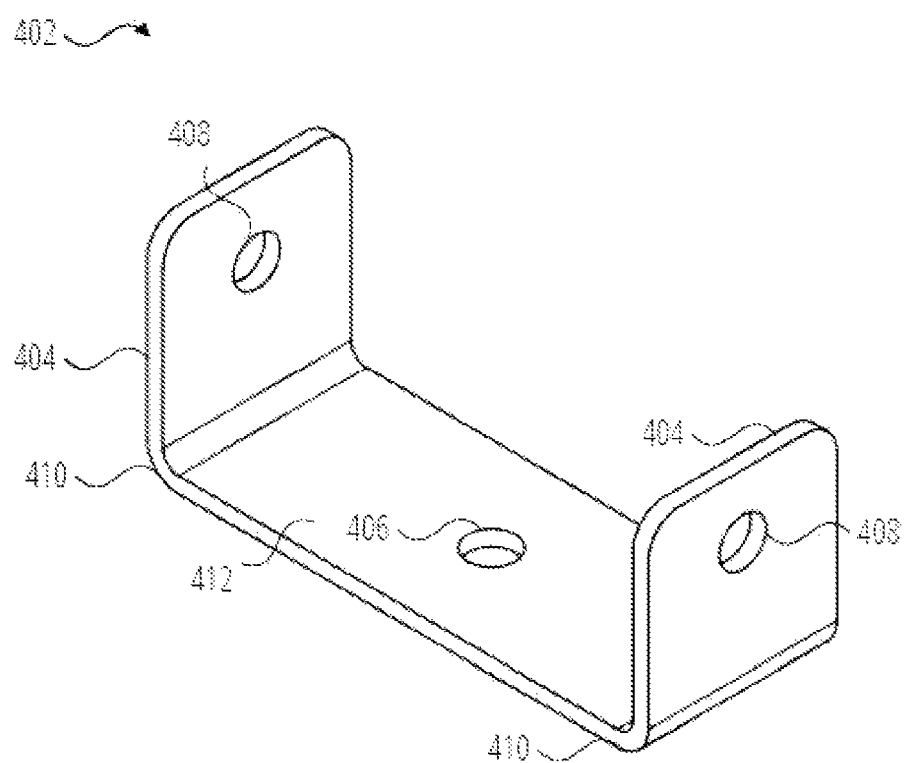
FIG. 4 shows a perspective view of a U-shaped member of a connecting bracket of an embodiment of the articulating support bracket.

Referring now to FIGS. 2 and 3, there are shown perspective views of a different sleeves of an embodiment of the articulating support bracket. In some embodiments, the articulating support bracket comprises a sleeve bracket or a sleeve 202. The sleeve 202 in this embodiment of the invention comprises an essentially double ended open cube structure. The sleeve 202 includes a first pair of opposing sides 104 and a second pairs of opposing sides 106 and two open ends 206 (only one of which is shown). Each side of the first pair of opposing sides 104, and each side of the second pair of opposing sides 106, have a connection point or connection points 110. The sleeve 202 illustrated in FIG. 2 is configured to accommodate an essentially square piece of lumber. For example, to accommodate lumber having pre-planed dimensions of: 2"×2"; 4"×4"; or 6"×6".

FIG. 3 shows another perspective view of embodiment of a sleeve 202. The sleeve 202 in this embodiment of the invention can be seen to have a first pair of opposing sides 104 and a second pairs of opposing sides 106 and two open ends 206. Each side of the first pair of opposing sides 104, and each side of the second pair of opposing sides 106, having an alternative connection point 302 or points. The sleeve 202 again is configured to accommodate an essentially square piece of lumber having pre-planed dimensions of: 2"×2"; 4"×4"; or 6"×6". The sleeve 202 allows for a first structural member to connect to a second structural member at a midpoint disposed between the ends thereof.

Referring now to FIGS. 4-8, there is shown a perspective view of a U-shaped member of a connecting bracket of an embodiment of the articulating support bracket, side views of a connecting bracket of an embodiment of the articulating support bracket, wherein the U-shaped members are disconnected and connected from one another, and perspective views of a connecting bracket of an embodiment of the articulating support bracket, respectively. In the illustrated embodiment, the articulating support bracket comprises a connecting bracket 502 configured to pivotally secure a supporting cap bracket to a sleeve or another supporting cap bracket or to pivotally secure a sleeve to another sleeve.

In the illustrated embodiment, the connecting bracket 502 comprises a pair of substantially U-shaped members 402. Each U-shaped member 402 comprises a cap or sleeve member 412 connected to a pair of opposing tabs 404. The cap or sleeve member 412 includes a contact member connection point 406, and a pair of opposing tabs 404 having a bolt connection point 408. In the illustrated embodiment, the connection points are apertures extending through the U-shaped member 402 configured to receive a fastener therethrough.

Figure 5:
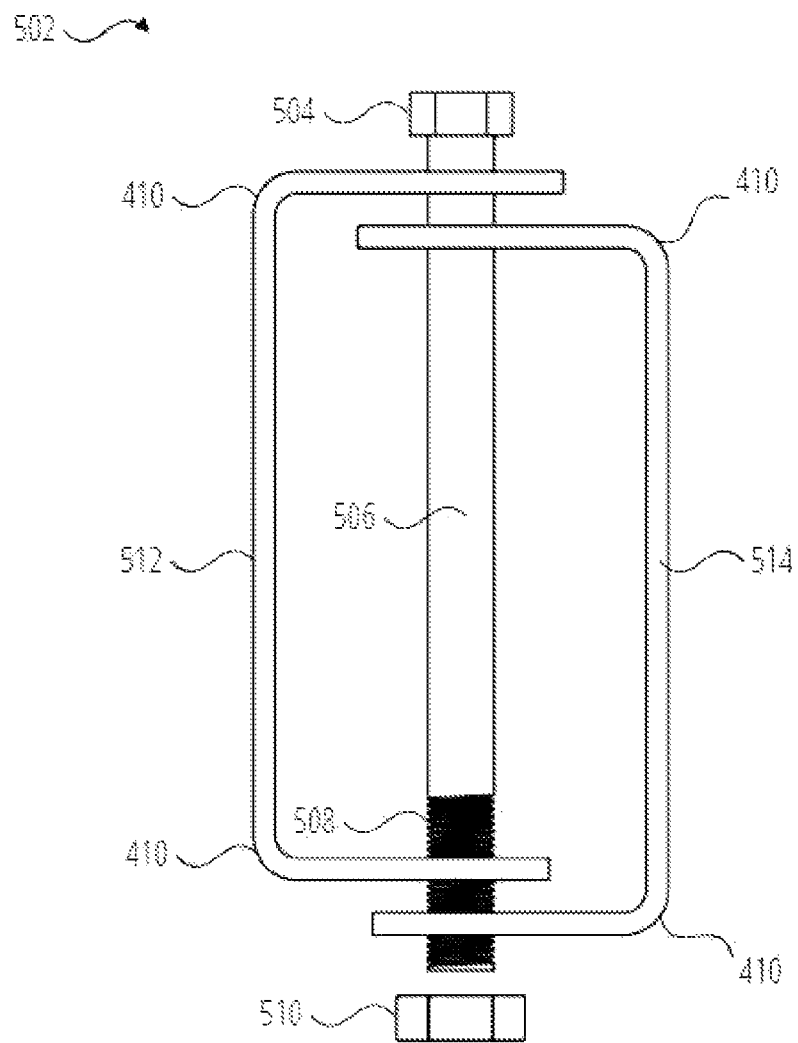
FIG. 5 shows a side view of a connecting bracket of an embodiment of the articulating support bracket, wherein the U-shaped members are disconnected from one another.

FIG. 5 shows a side view of a disconnected connecting bracket 502. The disconnected connecting bracket 502 comprises two U-shaped members 402, wherein the tabs 402 are in an offset alignment, but the bolt connection points 408 on each of the pair of opposing tabs 404 are in alignment. A bolt 506, having a bolt head 504 and bolt threads 508, is slotted through the bolt connection points 408 prior to a nut 510 being attached to the bolt thread 508.

Figure 6:
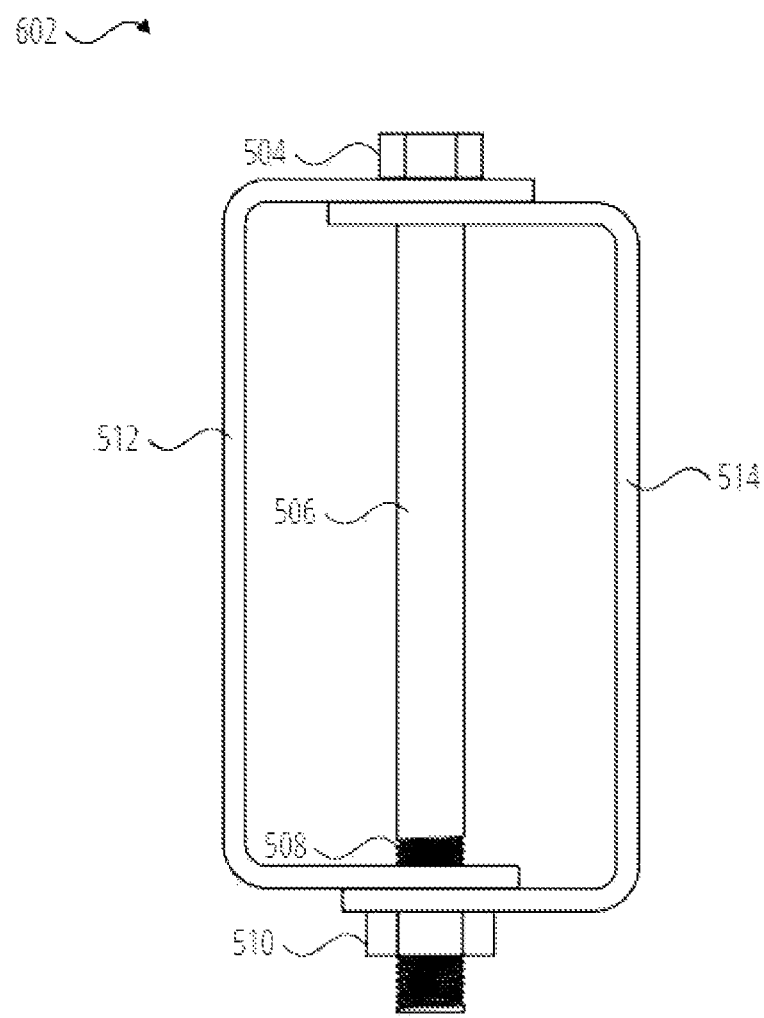
FIG. 6 shows a side view of a connecting bracket of an embodiment of the articulating support bracket, wherein the U-shaped members are connected to form the connecting bracket.
Figure 7:
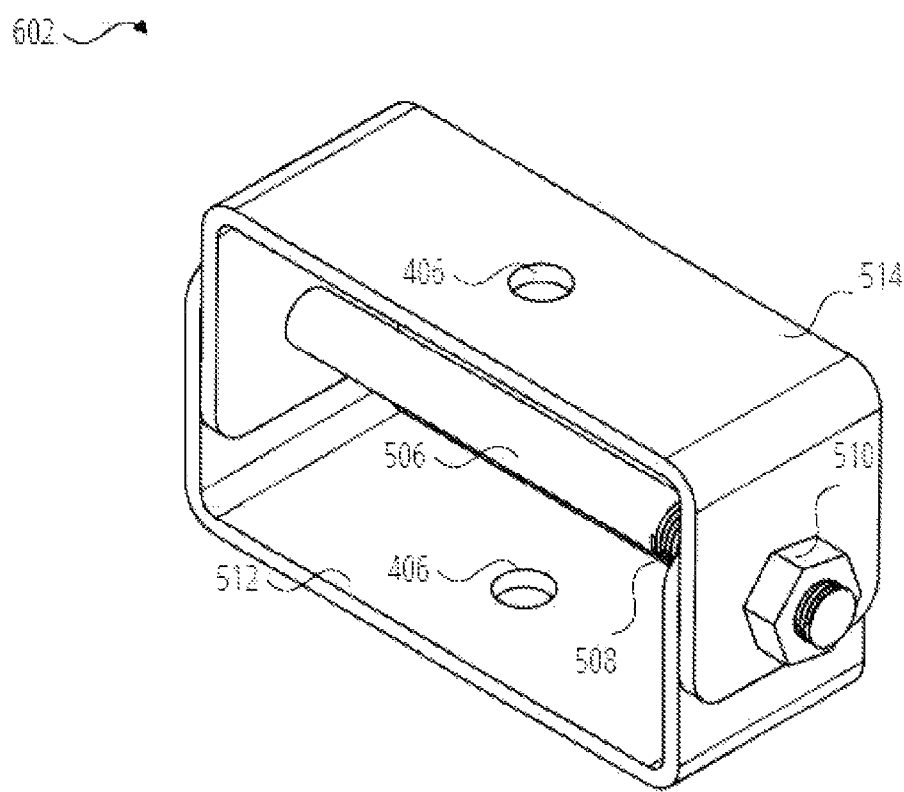
FIG. 7 shows a perspective view of a connecting bracket of an embodiment of the articulating support bracket.

FIGS. 6 and 7 show a side view of a connected connecting bracket 602. The connecting bracket 602 comprises two U-shaped members 402, wherein the U-shaped members 402 are in contact in an offset alignment, and the bolt connection points 408 on each of the pair of opposing tabs 404 are in alignment. The nut 510 has been tightened on the bolt threads 508, resulting in the pair of opposing tabs 404 on one of the U-shaped members 402 being pulled into tight friction fit contact with the other of the pair of opposing tabs 404 on the other of the U-shaped members 402.

Figure 10:
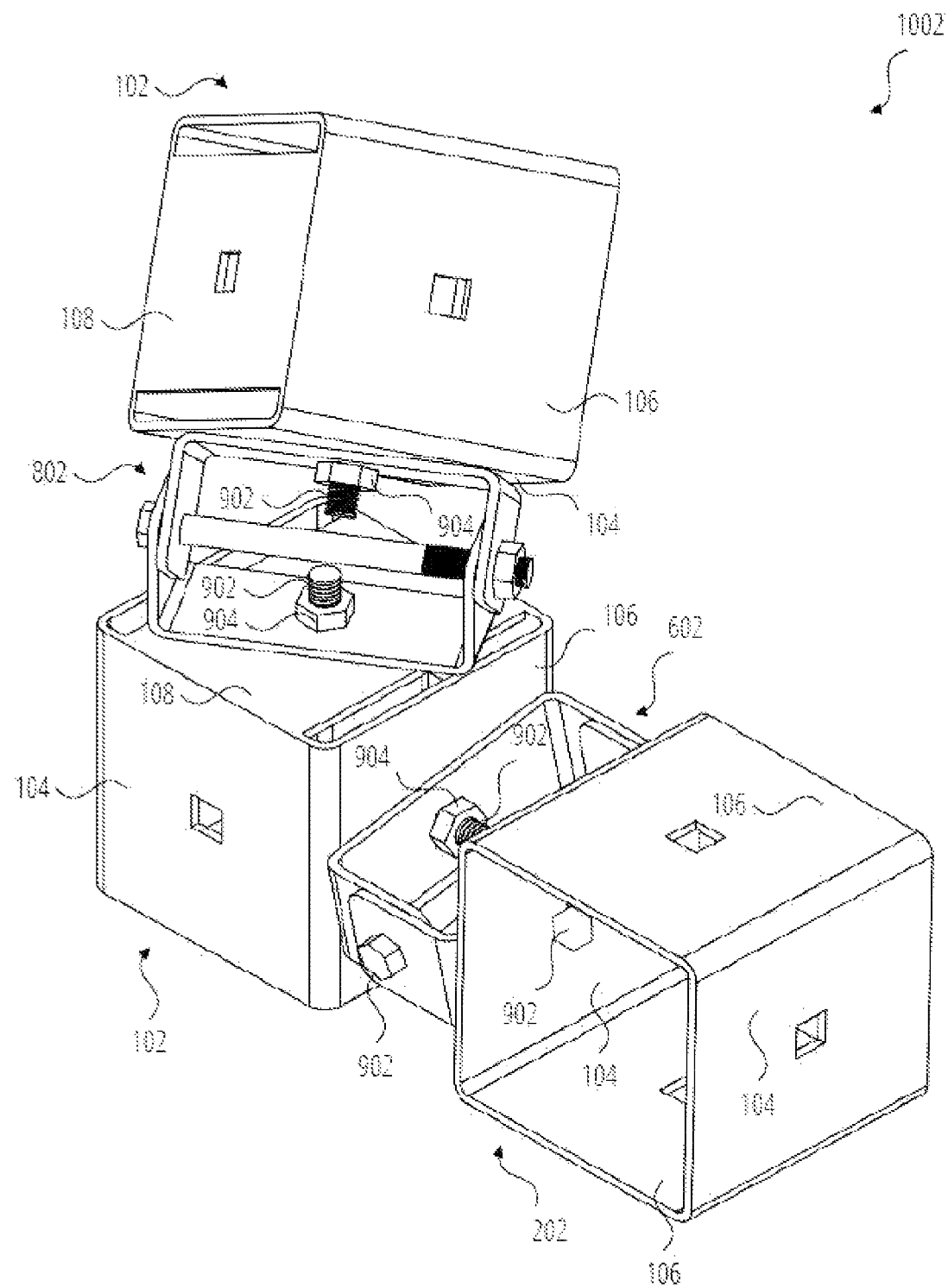
FIG. 10 shows a perspective view of an embodiment of the articulating support bracket in use.

In this particular embodiment of the invention, the U-shaped members 402 have been tightened into a configuration such that when a cap 102 or a sleeve 202 is attached to the cap or sleeve members 412, the cap 102 or sleeve 202 are in approximate parallel alignment (as shown in FIG. 10).

Figure 8:
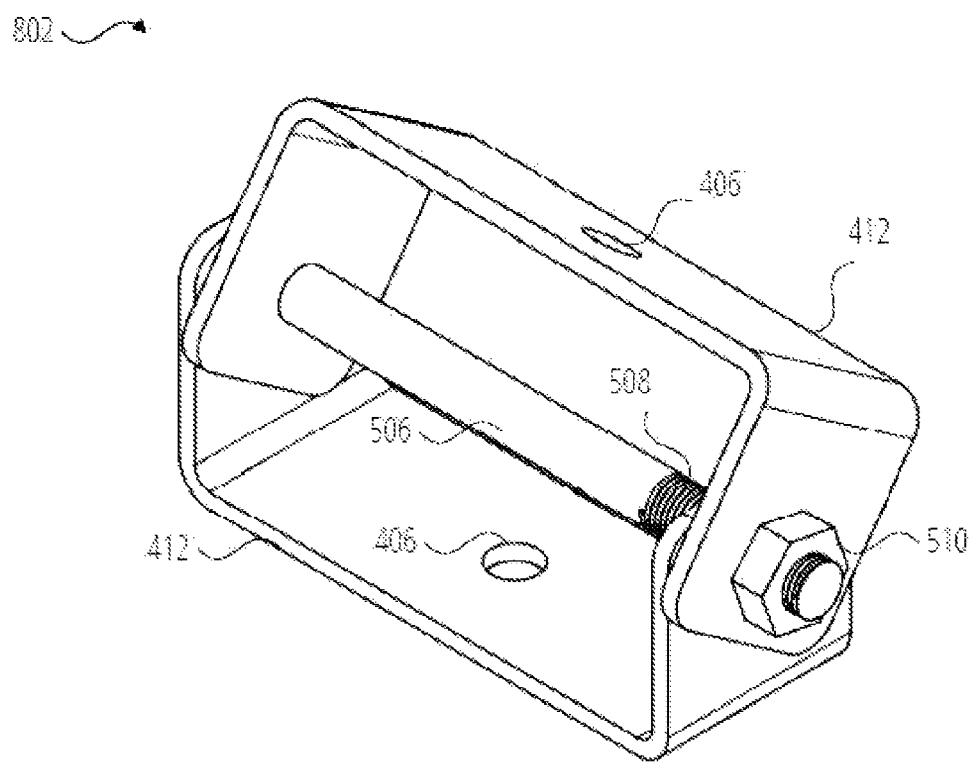
FIG. 8 shows another perspective view of a connecting bracket of an embodiment of the articulating support bracket.

FIG. 8 shows a perspective view of a connected angled connecting bracket 802. As in FIG. 6 and FIG. 7, the connected angled connecting bracket 802 illustrated herein has two U-shaped members 402 in an offset alignment, and the bolt connection points 408 on each of the pair of opposing tabs 404 are in alignment. The nut 510 has been tightened on the bolt threads 508, resulting in the pair of opposing tabs 404 on one of the U-shaped members 402 being pulled into tight friction fit contact with the other of the pair of opposing tabs 404 on the other of the U-shaped members 402.

In this embodiment, the U-shaped members 402 have been tightened into a configuration such that when a cap 102 or a sleeve 202 is attached to the cap or sleeve members 412, the structural member or lumber inserted into the cap 102 or sleeve 202 are positioned at an angle to each other.

Figure 9:
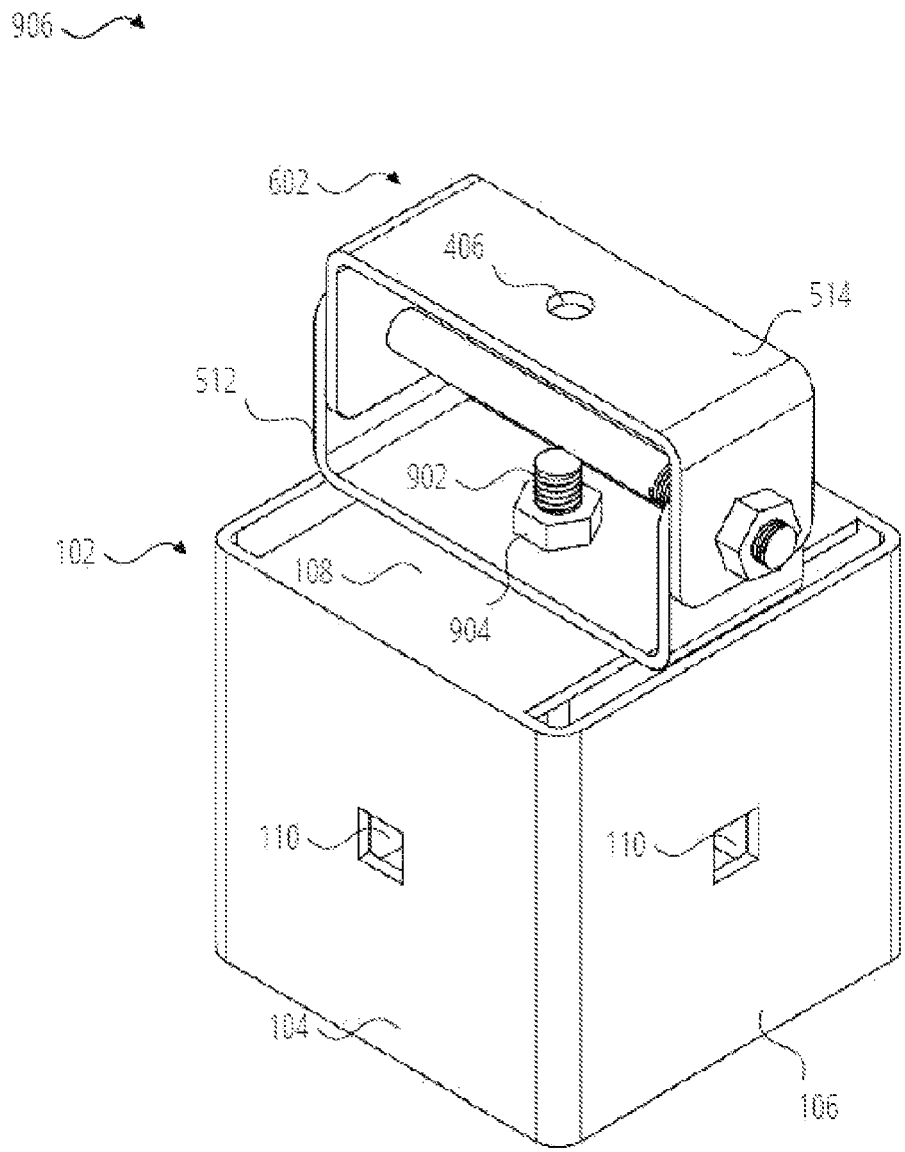
FIG. 9 shows a perspective view of a knuckle of an embodiment of the articulating support bracket.

Referring now to FIGS. 9 and 10, there is shown a perspective view of a knuckle of an embodiment of the articulating support bracket and a perspective view of an embodiment of the articulating support bracket in use, respectively. FIG. 9 shows a perspective view of a knuckle 906 of an embodiment of the invention. The knuckle 906, in this embodiment of the invention, comprises a cap 102 and a secured connecting bracket 602. The secured connecting bracket 602 has been fixed in a non-angled format and is connected to the closed end 108 of a cap 102. A connecting bolt 902 and a connecting nut 904 have been used to connect the U-shaped member connection point 406 of the cap or sleeve member 412 to the connection point 110 on the closed end 108 of the cap 102. In the shown embodiment, the connecting bracket 602 is adapted to be rotated about the connecting bolt 902 so as to enable connection to a second cap at a desired angle.

FIG. 10 shows a perspective view of a combination 1002 of an embodiment of the invention. The combination 1002 as illustrated comprises a sleeve 202 connected to one of a second pair of opposing sides 106 of a cap 102 via a secured connecting bracket 602. The cap 102 being connected on its closed end 108 to one of a first pair of opposing sides 104 of another cap 102 via a connected angled connecting bracket 802. Other parts shown in this figure are as previously described in other figures.

Figure 11:
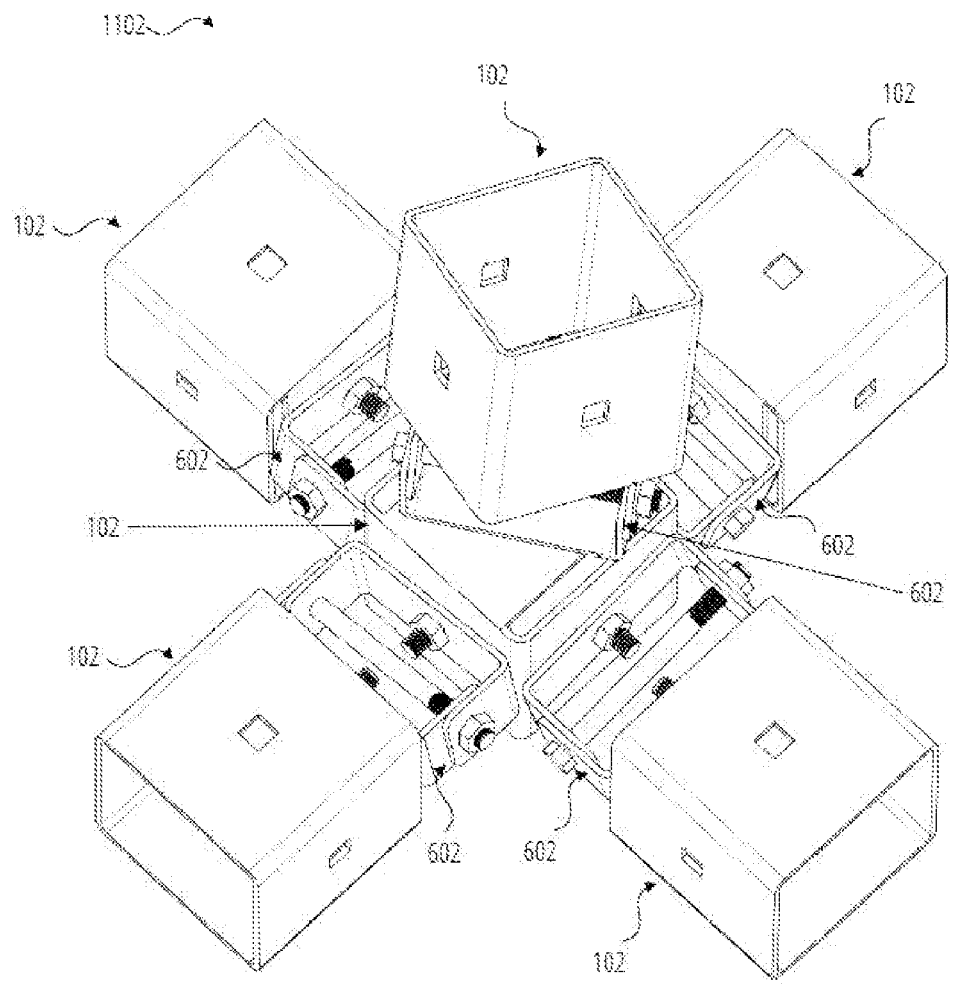
FIG. 11 shows a perspective view of an embodiment of the articulating support bracket in use.
Figure 12:
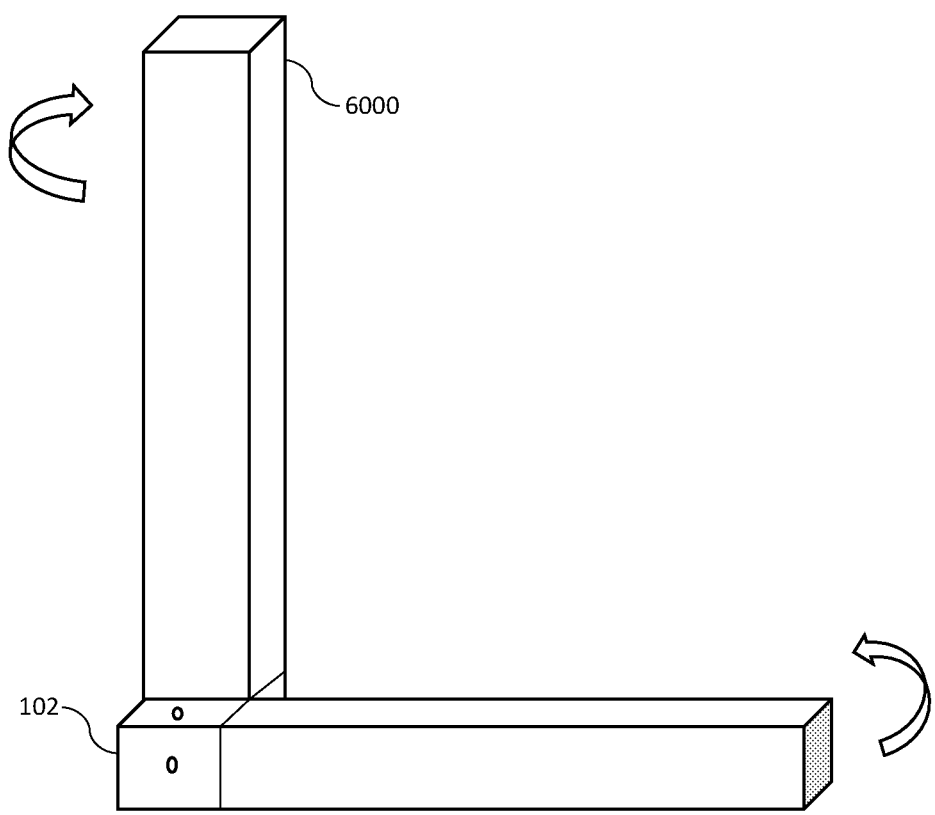
FIG. 12 shows another perspective view of an embodiment of the articulating support bracket in use.

Referring now to FIGS. 11 and 12, there are shown perspective views of an embodiment of the articulating support bracket in use. FIG. 11 shows a perspective view of a combination crown 1102 of an embodiment of the invention. The embodiment illustrated herein shows five caps 102 attached via their closed ends 108 to a first pair of opposing sides 104, second pairs of opposing sides 106 and closed end 108 of a sixth cap 102. The open ends 206 of five or six of the caps 102 can have suitably sized structural members or lumber inserted therein, the lumber being secured in place within the caps 102 by various fastening members such as screws or bolts through the connection points 110 on the caps 102.

The figures and descriptions above outline examples of some of the connecting and support brackets that can be used to couple structure frame materials together in a way that allows the consumer the opportunity to change angles as and when required. In a typical embodiment of the invention, designed to accommodate 4"×4" lumber 6000, support brackets including the caps 102 and sleeves 202 are made from 4"×4"×⅛" steel square tubing. The sleeves 202 are fabricated to have connection points 110 in each of the sides, shown in the figures as first pair of opposing sides 104 and second pair of opposing sides 106. The caps 102 are similarly fabricated, but additionally have a closed end 108 welded in place attached to either the first pair of opposing sides 104 or the second pair of opposing sides 106. The connection points 110 may be round or square channels or holes bored through the opposing sided or the closed end 108 of the cap 102.

The connecting brackets, or connected hinges 602, are typically fabricated from two hingedly connected U-shaped members 402 each having U-shaped connection points 406. The U-shaped members 402 may be formed from a unitary piece of ⅛" steel conformed into a 'U' or 'C' shaped structure, for example having a 2"×4" cap or sleeve member 412 with a bolt connection point 408 and a pair of opposing tabs 404 that are approximately 2"×2".

The U-shaped members 402 are joined together to form a secured connecting bracket 602 and secured angled connecting bracket 802 by bolts 506 and nuts 510 through the bolt connection points 408 in the pair of opposing tabs 404. Other bolts, including but not limited to ½" and ⅜" bolts, are then used to attach a variety of caps 102 and sleeves 202 to the connected hinge 602 or secured angled connecting bracket 802 via connection points 110 to U-shaped member connection points 406.

When a suitable knuckle 906, combination 1002 or crown 1102 has been constructed, lumber is cut using 90 degrees cuts, inserted into the supporting brackets, such as caps 102 and sleeves 202 and secured in place using additional fasteners including screws and bolts through unused connection points 110.

This system described herein thereby allows the user the ability to make simple 90 degrees cuts in lumber rather than measuring, calculating and miter cutting lumber. The user can test fit material on terrain with little to no preplanning, and then simply tighten the nuts 510 and bolts 506 within the secured connecting members 602 and secured angled connecting members 802 when an appropriate framework has been constructed.

In some embodiments of the invention, the connection points have square holes that cooperate with a raised square section on the carriage bolt. The arrangement allows the nut to be tightened onto the bolt with minimal slippage. In other embodiments of the invention, the connection points have round holes. This arrangement typically includes the use of star or locking washers to allow the nut to be tightened onto the bolt with minimal slippage.

In one embodiment, the method for constructing a framework is essentially as follows: Calculate and cut the lengths of the lumber required for the framework. Connect the connecting member of a connecting bracket to the top or sides of a cap or sides of a sleeve using a combination of bolts, nuts, and washers. The connecting members are held onto the cap or sleeve using a low-profile carriage bolt, secured in place with a star (or locking) washer, and a nut combination. The carriage bolt being inserted from inside the cap outwards towards the hinge. The star washer (or locking washer) is then placed onto the carriage bolt followed by the connecting member, then secured by the nylon nut. Attach a cap and connecting member to the ends of the lumber that are to be attached to each other or a sleeve and U-shaped member to long sections of lumber. Conjoin two abutting U-shaped members with a bolt and nut between the U-shaped members creating a connecting bracket between the two caps, or cap and sleeve, or two sleeves. The caps and/or sleeves and the connecting brackets, that are formed between two U-shaped members, are loosely secured in place allowing the lumber supports to be appropriately positioned. The user then tightens the hinges with the assistance of the star or locking washers. This enables the user to maintain speculated angles to envision their desired structure shape. If using wood for conjoining material the user can secure with a leg bolt or eyelet screw. Simply insert the wood into the cap until tight and screw a fastener into the wood using a remaining carriage bolt hole that is not occupied by a U-shaped member.

The user is able to use material that is always cut at a simple 90-degree angle. The disclosed system allows the user to articulate the supporting framework to the desired angle and tighten into place. All the while maintaining the integrity of the material used without waste from wrong angle cuts or change in design and configuration. Once the structure is completed to desired design, fine tune adjustments can be made to square, level or change at any time by loosening and retightening the hardware.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An articulating support bracket, comprising:
a plurality of supporting brackets each having a hollow interior for receiving a structural member therein;
wherein each supporting bracket comprises a pair of opposing first sides perpendicular to a pair of opposing second sides, and at least one open end;
wherein the pair of opposing first sides and the pair of opposing second sides extend directly from opposing edges of the at least one open end;
a connection point disposed on each of the first sides and each of the second sides;
a connecting bracket configured to connect with one or more of the plurality of supporting brackets at the connection point thereof via a fastener;
wherein the connecting bracket comprises a hinge that is configured to pivot a first supporting bracket of a plurality of supporting cap brackets relative to a second bracket of the plurality of supporting cap brackets when both the first and second supporting brackets are connected to the connecting bracket.

2. The articulating support bracket of claim 1, wherein the plurality of supporting brackets comprises one or more sleeve brackets having a substantially cubical shape comprising of a pair of opposing open ends.

3. The articulating support bracket of claim 1, wherein the connecting bracket comprises a pair of similarly dimensioned U-shaped members each having a sleeve member connected to a pair of opposing tabs, the sleeve member having a cooperating connection point that correspond to the connection point of the supporting brackets, and the pair of opposing tabs having a bolt connection point.

4. The articulating support bracket of claim 3, wherein the pair of U-shaped members are connected by overlapping each of the pair of opposing tabs wherein a bolt is positioned through the bolt connection point on each of the pair of opposing tabs to form the hinge.

5. The articulating support bracket of claim 4, wherein the pair of U-shaped members are secured into a fixed position via a nut and washer disposed onto each end of the bolt.

6. The articulating support bracket of claim 3, wherein each connecting bracket is adapted to secure to the structural member via a contact member connection point fastener disposed through a contact member connection point.

7. The articulating support bracket of claim 6, wherein a first supporting member is secured to the first supporting bracket and a second structural member is secured to the second supporting bracket via one or more structural fasteners.

8. The articulating support bracket of claim 7, wherein the connecting bracket is adapted to adjust an angle relative between the first and second supporting members via the hinge, wherein the connecting bracket is adapted to rotate about the contact member connection point fastener.

9. A method of constructing a modular framework of a plurality of structural members, the method comprising:
providing an articulated support bracket comprising:
a plurality of supporting cap brackets each having a hollow interior for receiving a structural member therein;
wherein each supporting cap bracket comprises a pair of opposing first sides perpendicular to a pair of opposing second sides, a closed end and an opposing open end;
a connection point disposed on each of the first sides, the second sides and the closed end;
a connecting bracket that forms a hinge and is configured to connect with one or more of a plurality of supporting brackets at the connection point thereof, wherein the connecting bracket comprises a pair of similarly dimensioned U-shaped members each having a sleeve member connected to a pair of opposing tabs, the sleeve member having a cooperating connection point, and the pair of opposing tabs having a bolt connection point;
attaching the connecting bracket to a first supporting cap bracket of the plurality of supporting cap brackets;
inserting an end of a first structural member into the open end of the first supporting cap bracket;
attaching the connecting bracket to a second supporting cap bracket of the plurality of supporting cap brackets;

inserting an end of a second structural member into the open end of the second supporting cap bracket;

rotating the first structural member relative to the second structural member about the connecting bracket until a desired angle between the first and second structural members is obtained.

10. The method of claim 9, wherein the pair of U-shaped members are connected by overlapping each of the pair of opposing tabs and a bolt is inserted into the bolt connection point on each of the pair of opposing tabs.

11. The method of claim 9, further comprising:
attaching a second connecting bracket to a sleeve bracket having a substantially cubical shape, wherein the sleeve bracket comprises a first pair of opposing sides, a second pair of opposing sides, and opposing open ends, each of said opposing sides having a connection point;
inserting a third structural member into the sleeve bracket.

12. A method of constructing a modular framework of a plurality of structural members, the method comprising:
providing an articulated support bracket comprising:
a plurality of supporting cap brackets each having a hollow interior for receiving a structural member therein;
wherein each supporting cap bracket comprises a pair of opposing first sides perpendicular to a pair of opposing second sides, a closed end and an opposing open end;
a connection point disposed on each of the first sides, the second sides and the closed end;
a connecting bracket formed by a pair of U-shaped members that form a hinge when secured to one another, wherein the connecting bracket is configured to connect with one or more of a plurality of supporting brackets at the connection point thereof;
attaching the first U-shaped member to a first supporting cap bracket of the plurality of supporting cap brackets;
inserting an end of a first structural member into the open end of the first supporting cap bracket;
attaching the second U-shaped member to a second supporting cap bracket of the plurality of supporting cap brackets;
inserting an end of a second structural member into the open end of the second supporting cap bracket;
connecting the first U-shaped member with the second U-shaped member to form the connecting bracket;
rotating the first structural member relative to the second structural member about the connecting bracket until a desired angle between the first and second structural members is obtained.

13. The method of claim 12, wherein the pair of U-shaped members comprise a substantially same dimension and each include a sleeve member connected to a pair of opposing tabs, the sleeve member having a cooperating connection point, and the pair of opposing tabs having a bolt connection point.

14. The method of claim 13, wherein the pair of U-shaped members are connected by overlapping each of the pair of opposing tabs and a bolt is inserted into the bolt connection point on each of the pair of opposing tabs.

15. The method of claim 12, further comprising:
attaching a second connecting bracket to a sleeve bracket having a substantially cubical shape, wherein the sleeve bracket comprises a first pair of opposing sides, a second pair of opposing sides, and opposing open ends, each of said opposing sides having a connection point;
inserting a third structural member into the sleeve bracket.

16. The method of claim 15, wherein the pair of U-shaped members comprise a substantially same dimension and each include a sleeve member connected to a pair of opposing tabs, the sleeve member having a cooperating connection point, and the pair of opposing tabs having a bolt connection point.

17. The method of claim 16, wherein the pair of U-shaped members are connected by overlapping each of the pair of opposing tabs and a bolt is inserted into the bolt connection point on each of the pair of opposing tabs.

* * * * *